(12) United States Patent
Ratner et al.

(10) Patent No.: US 8,467,674 B1
(45) Date of Patent: Jun. 18, 2013

(54) WALKING STICK WITH IMU

(75) Inventors: Daniel Jason Ratner, San Francisco, CA (US); Russell Leigh Smith, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 22 days.

(21) Appl. No.: 13/239,216

(22) Filed: Sep. 21, 2011

(51) Int. Cl.
G03B 17/24 (2006.01)
G03B 17/48 (2006.01)

(52) U.S. Cl.
USPC .......................... 396/310; 396/429

(58) Field of Classification Search
USPC .................. 396/310, 429
See application file for complete search history.

(56) References Cited

U.S. PATENT DOCUMENTS

| | | | | |
|---|---|---|---|---|
| 2,184,815 A | * | 12/1939 | Reynolds | 74/501.6 |
| 3,546,467 A | * | 12/1970 | Benham et al. | 250/215 |
| 4,280,204 A | * | 7/1981 | Elchinger | 367/116 |
| 5,973,618 A | * | 10/1999 | Ellis | 340/990 |
| 6,668,846 B2 | * | 12/2003 | Meador | 135/65 |
| 6,745,786 B1 | * | 6/2004 | Davis | 135/65 |
| 6,853,909 B2 | | 2/2005 | Scherzinger | |
| 6,933,855 B2 | * | 8/2005 | Preston | 340/4.13 |
| 7,267,281 B2 | * | 9/2007 | Hopkins | 235/462.45 |
| 7,287,874 B2 | * | 10/2007 | Irisawa | 362/233 |
| 2009/0223546 A1 | * | 9/2009 | Nazarian | 135/66 |
| 2010/0141759 A1 | | 6/2010 | Scherzinger | |

OTHER PUBLICATIONS

Ojeda, Lauro, et al., "Personal Dead-reckoning System for GPS-denied Environments", IEEE International Workshop on Safety, Security, and Rescue Robotics (SSRR2007), Rome, Italy, Sep. 27-29, 2007, pp. 1-6.

Almeida, Oscar, et al., "Dynamic Fall Detection and Pace Measurement in Walking Sticks", Proceedings of the 2007 Joint Workshop on High Confidence Medical Devices, Software, and Systems and Medical Device Plug-and-Play Interoperability, IEEE Computer Society Washington, DC, USA, 2007, pp. 204-206.

"Piezoelectric sensor", http://en.wikipedia.org/wiki/Piezoelectric_sensor, modified Jul. 25, 2011, downloaded Aug. 22, 2011, pp. 1-3.

* cited by examiner

*Primary Examiner* — Rodney Fuller
(74) *Attorney, Agent, or Firm* — Sterne, Kessler, Goldstein & Fox, P.L.L.C.

(57) ABSTRACT

An elongated member is provided with one or more imaging sensors, location sensors, and a switch in its bottom end. For example, in an embodiment the elongated member may be a walking stick and the one or more imaging sensors may be one or more cameras Such a walking stick takes pictures of its surrounding environment and keeps records of its location when the switch touches the ground, so that the pictures and location information can be used to create a virtual simulation of the area that a user of the walking stick has walked through.

17 Claims, 4 Drawing Sheets

WALKING STICK WITH IMU

BACKGROUND

Presently, an interactive navigation system displays images taken from a fleet of specially adapted cars. Areas not accessible by car, like pedestrian areas, narrow streets, alleys and ski resorts, are sometimes covered by tricycles or snowmobiles. These vehicles typically use multiple directional cameras for 360° views at a standard height, GPS units for positioning and laser range scanners for the measuring location in the front of the vehicle.

Where available, navigation images can appear after zooming in beyond the highest zooming level in maps and satellite images, and also by dragging a "pegman" icon onto a location on a map. A user can select the horizontal and vertical viewing direction and the zoom level can be selected. A solid or broken line in the photo shows the approximate path followed by the camera car, and arrows link to the next photo in each direction. At junctions and crossings of camera car routes, more arrows are shown.

However, even the use of vehicles such as tricycles or snowmobiles does not offer access to areas where vehicular travel is difficult, such as in rugged areas or areas where roads are not present.

BRIEF SUMMARY

Embodiments relate to an elongated member with environmental image-gathering features and a related method for capturing one or more environmental images.

According to an embodiment, an elongated member with environmental image-gathering features is provided. The elongated member has a top end and a bottom end, the elongated member configured to be carried by a user. One or more imaging sensors are coupled to the walking stick. There is a switch coupled to the bottom of the elongated member that activates the one or more imaging sensors to capture one or more images of the environment surrounding the elongated member each time the switch receives a signal that the user has planted the bottom end of the elongated member on a surface.

According to another embodiment, a method is provided for capturing one or more environmental images. A contact signal is received from a sensor on a bottom end of an elongated member. In response to the contact signal, one or more images are captured of the environment surrounding the elongated member using one or more imaging sensors coupled to the walking stick. This process is repeated as the bottom end of the elongated member is re-planted.

Further embodiments, features, and advantages of the invention, as well as the structure and operation of the various embodiments of the invention are described in detail below with reference to accompanying drawings.

BRIEF DESCRIPTION OF THE FIGURES

The accompanying drawings, which are incorporated herein and form a part of the specification, illustrate the subject of the present application and, together with the description, further serve to explain the principles of the subject of the present application and to enable a person skilled in the pertinent art to make and use the subject of the present application.

The drawing in which an element first appears is typically indicated by the leftmost digit or digits in the corresponding reference number. In the drawings, like reference numbers may indicate identical or functionally similar elements.

DETAILED DESCRIPTION OF EMBODIMENTS

Figure 1:
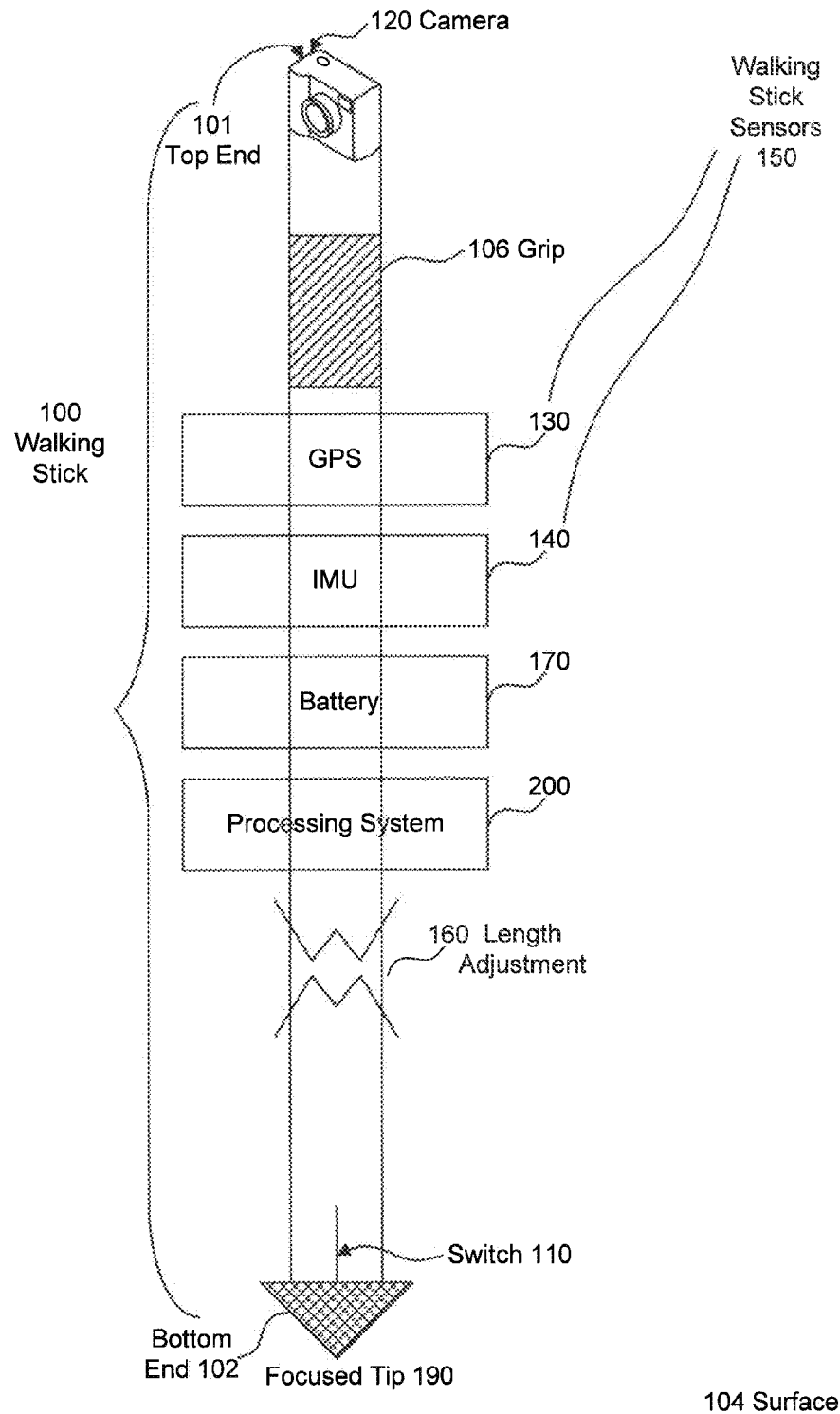
FIG. 1 is a diagram illustrating an exemplary walking stick with image gathering and location sensing capabilities, according to an embodiment.

In the detailed description of embodiments that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Overview

Walking sticks can facilitate crossing uneven terrain because they provide an extra point of stability as a user walks over rocky surfaces. Walking sticks also provide a source of timing information in that walking sticks, as ordinarily used, are planted on the ground between strides by a user. Thus, the regular contacts made by the bottom of the walking stick with the ground provide signals at roughly even intervals.

In order to gather information from difficult-to-access areas, two problems arise. One is that it is necessary to have a stable place 1-3 meters above the ground to hold one or more cameras that can capture visual data for virtual environment technology. It is also necessary that there be some way of generating a signal to trigger the one or more cameras' shutters at regular intervals.

Walking sticks can be used for environmental image-gathering, because they provide a stable support for image-gathering at an appropriate height. In this way they function as monopods, because when planted on a surface, a user of the walking stick can rest the walking stick on the ground as a means of support. Furthermore, walking sticks can provide information that can be used to signal to one or more imaging sensors (which may be one or more cameras mounted on the top end of the walking stick) that it is an appropriate time to capture images when the bottom end of the walking stick contacts the ground.

Embodiments presented herein refer to a walking stick. However, a walking stick is only one possible type of elongated member that may be used, and other types of elongated members, such as a cane, a crutch, a monopod, a trekking pole, a staff, or a rod may be used appropriately as alternative embodiments. Some elongated members, such as trekking poles, may be collapsible, a feature which aids in portability.

Also, in embodiments presented herein, the image-gathering features have been designated as being performed by one or more cameras. Digital cameras represent an effective approach to image gathering, as they produce digital image information that is easily processed. However, it will be recognized that cameras are only one means of image-gathering, and other image sensors may be used to accomplish or aid in the task of image gathering. For example, the cameras may be analog or digital cameras, or a combination. Likewise, other types of image-gathering devices, such as light sensors, photovoltaic sensors, scanners, or other image-gathering technologies may be used to gather images in alternative embodiments.

FIG. 1 is a diagram illustrating an exemplary walking stick with image gathering and location sensing capabilities, according to an embodiment. Walking sticks may be made of any solid material, but exemplary materials are wood, metal, plastic, or combined arrangements of these materials. FIG. 1 includes a walking stick 100. Walking stick 100 includes a top end 101 and a bottom end 102. The top end may include one or more cameras 120. In FIG. 1, one camera 120 is illustrated, but more cameras may be used in certain embodiments. For example, an alternative arrangement (not shown) is to use four cameras 120, each pointing in perpendicular directions, so that an exemplary embodiment may use one camera 120 pointing ahead, one camera 120 pointing behind, one camera 120 pointing to the left, and one camera 120 pointing to the right.

One or more cameras 120 are generally mounted at top end 101 of the walking stick 100. Given a two-meter walking stick 100, this gives one or more cameras 120 a height of almost two meters, though they may be lower on the stick. It is also acceptable to have a shorter or longer walking stick 100, or walking stick 100 may have an adjustable height which can be changed by a length adjustment module 160, such as by a telescoping section. Height adjustments may be automatically factored into the operation of one or more cameras 120 as operational parameters. One or more cameras 120 may also be tilted up or down, and one or more cameras 120 may have adjustable tilting positions.

In addition to one or more cameras 120, the walking stick may have additional features. For example, it may have a grip area 106. Such an area may be covered with or made of a material such as rubber for comfort and improved traction.

In addition to one or more cameras 120, walking stick 100 may be associated with a number of walking stick sensors 150. For example, walking stick 100 may have integrated into it a GPS 130 or inertial measurement unit 140 (IMU) that helps the walking stick 100 to establish its location. Location information from GPS 130 or IMU 140 can aid walking stick 100 to help integrate images from one or more cameras 120 into a virtual environment, which is discussed in greater depth below.

Walking stick 100 may additionally have integrated into it a battery 170 that provides power for one or more cameras 120 and a processing system 200 (discussed in FIG. 2) that provide an information processing infrastructure for walking stick 100 to help organize and coordinate the information gathering features of walking stick 100.

Walking stick 100 additionally has integrated into it a switch 110 that produces a signal when bottom end 102 touches a surface 104 upon which a user plants walking stick 100. In particular, walking stick 100 may have a focused tip 190 as part of bottom end 102 that detects when the end of the walking stick touches the ground. Focused tip 190 of bottom end 102 is focused in the sense that focused tip 190 has a defined area, or focus, that triggers one or more cameras 120 when focused tip 190 touches surface 104 over which a user walks. For example, focused tip 190 may be a flat tip or a pointed tip that includes a pressure sensor, integrated into focused tip 190, that triggers the switch 110, which in turn triggers camera 120. The specifics of the operation of the pressure sensor and switch 110 are discussed below. When focused tip 190 or bottom end 102 of the walking stick contacts surface 104, switch 110 will activate.

However, focused tip 190 is not required and embodiments may simply produce a signal when bottom end 102 touches surface 104. In embodiments presented herein, switch 110 has been characterized as a pressure-sensitive switch 110 that activates upon detecting contact between bottom end 102 of walking stick 100 and surface 104. However, pressure is only one criterion for detecting contact between the bottom end 102 and surface 104, and any switch 110 that can reliably detect contact between the bottom end of the walking stick and a surface may be used as switch 110. For example, switch 110 may use a light sensor, a motion sensor, a piezoelectric sensor, or any other type of sensor that can reliably indicate when the bottom end of the walking stick has contacted the surface. The sensor will typically be chosen such that every time the bottom end of the walking stick contacts the surface, switch 110 activates exactly once to obtain images. False positives may occur when switch 110 activates when there is no contact or switch 110 activates multiple times for a single contact. False negatives may occur when switch 110 does not activate when there is contact. The sensor will typically be chosen such that false positives and false negatives are avoided.

When switch 110 activates in response to contact between focused tip 190 or bottom end 102 and surface 104, one or more cameras 120 are in turn each used to take a picture of the surroundings of walking stick 100. Generally, if there are multiple cameras 120 all of cameras 120 are triggered when switch 110 is triggered, but this can be customized in embodiments so that only a subset of one or more cameras 120 take pictures.

Figure 2:
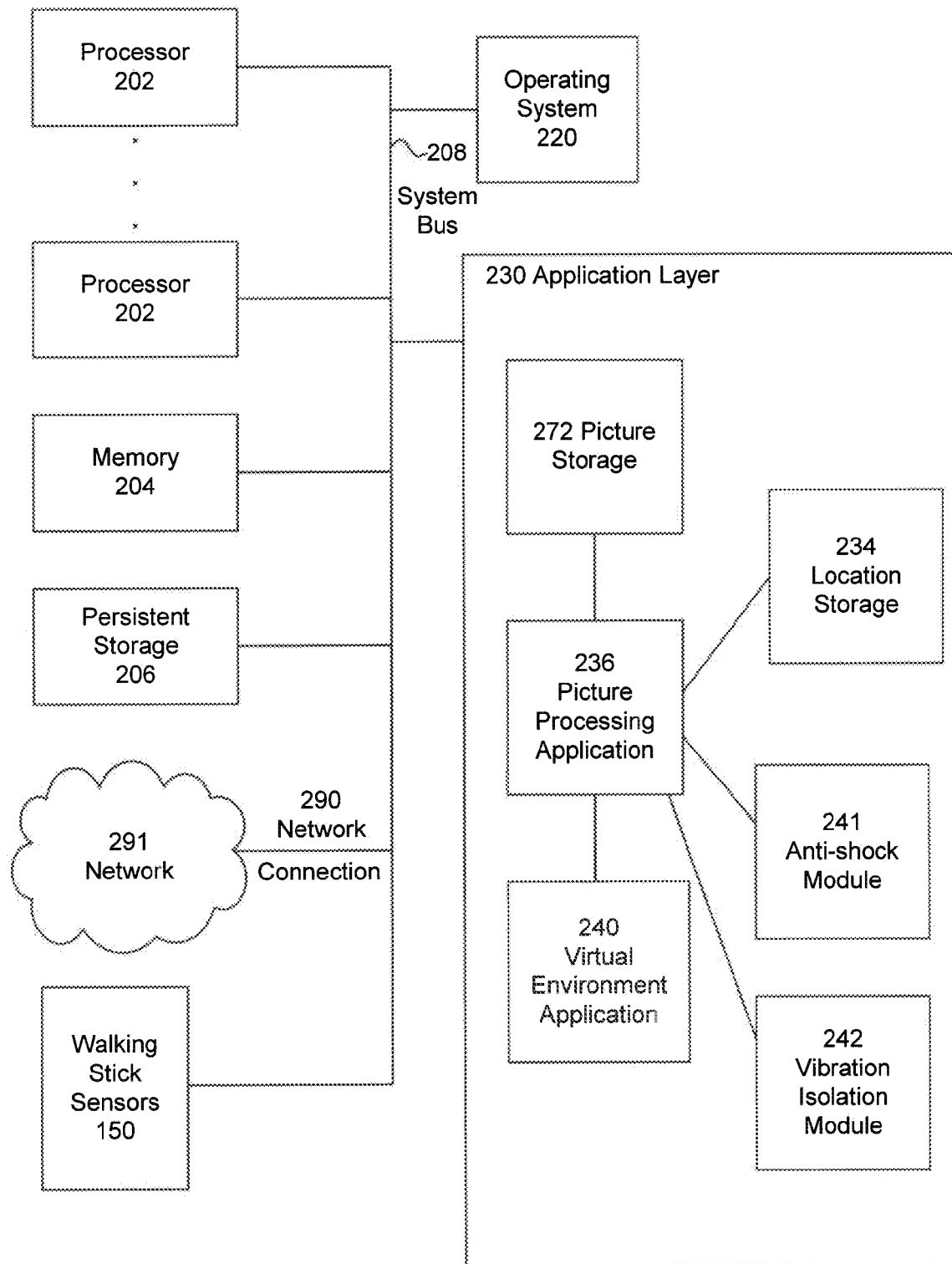
FIG. 2 is a diagram of a processing system that supports the image gathering and location sensing capabilities of the walking stick, according to an embodiment.

FIG. 2 is a diagram of a processing system 200 that supports the image gathering and location sensing capabilities of walking stick 100, according to an embodiment. The diagram of FIG. 2 illustrates a processing system 200 that contains a combination of hardware, software, and firmware constituent parts that allow it to run an application layer 230. Processing system 200 may optionally have access to a network 291, such as by using a network connection 290. Network connection 290 will generally need to be a wireless connection, as a wireless connection allows walking stick 100 to be mobile. Processing system 200 may be localized in a portable computing device embedded in walking stick 100, or network connection 291 may lead to a distributed architecture for processing system, where information is fed from a client processing system 200 at walking stick 100 via network connection 291 via a client-server or peer-to-peer connection for assistance in processing.

Processing system 200 as shown in FIG. 2 may be organized around a system bus 208, but any type of infrastructure that allows the hardware infrastructure elements of processing system 200 to communicate with and interact with each other may be used to function as this part of processing system 200.

The processing task in the embodiment of FIG. 2 is carried out by one or more processors 202, but it should be noted that any type of processing technology may be used here, including multi-core processors, multiple processors, or distributed processors. Additional specialized processing resources such as graphics, multimedia, or mathematical processing capabilities, either in hardware or in software, may also be used as adjuncts or replacements for processors 202 for certain processing tasks.

In order to manipulate data to act as an embodiment, processor 202 accesses a memory 204 via system bus 208. For data which needs to be stored more permanently, the processor accesses persistent storage 206. Processors 202, memory 204 and persistent storage 206 operate in coordination with operating system 220 to provide basic functionality for processing system 200. Operating system 220 provides support functionality for an applications layer 130.

Walking stick sensors 150 interface with application layer 230 over system bus 208, providing image and location information to the processing system. Application layer 230 stores the images in picture storage 272, and stores the location information in location storage 234. Picture storage 272 and location storage 234 may be databases, file storage, or any other form of information repository that can store the image and location information. There may also be an anti-shock module 241 and vibration isolation module 242 that will help to compensate for shocks and vibrations that otherwise might interfere with picture-taking due to the impact of bottom end 102. Picture processing application 236 retrieves the image data from picture storage 272 and the location data from location storage 234 and uses them to construct a set of information for a virtual environment in conjunction with virtual environment application 240.

Figure 3:
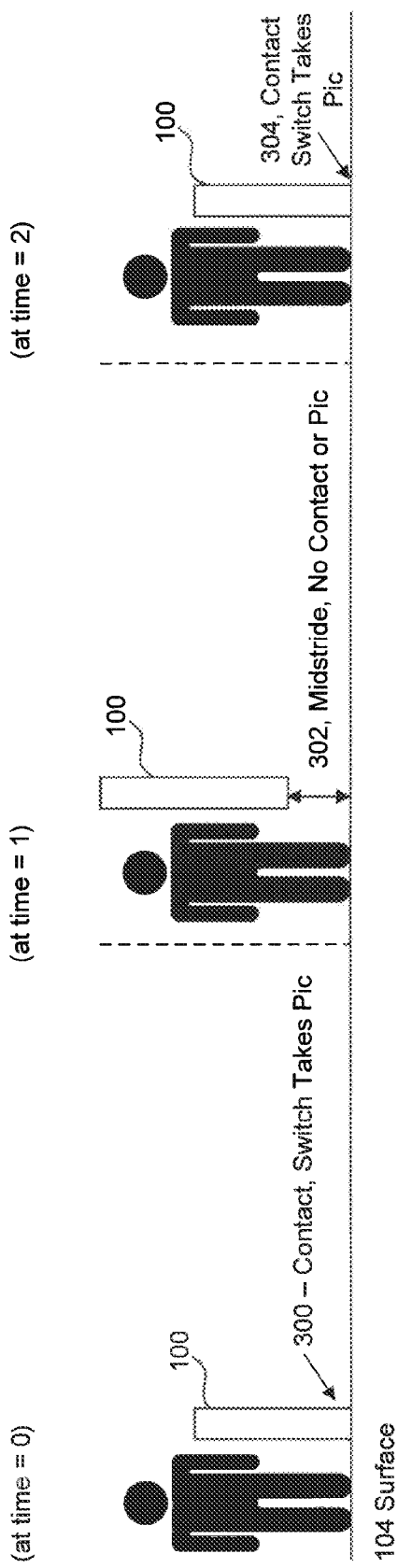
FIG. 3 is a diagram of an exemplary use of the walking stick by an exemplary user over time.

FIG. 3 is a diagram of an exemplary use of the walking stick by an exemplary user over time.

At time=0, at point 300, walking stick 100 is in contact with surface 104. Because of this, switch 110 activates, and one or more cameras 120 each take a picture. Switch 110 may operate to detect contact with several features. The pictures may be time-stamped, to aid picture processing application 236.

In general, switch 110 is activated each time bottom end 102 or focused tip 190 contacts surface 104. However, there may further be the criterion that the switch 110 activates by detecting a normal force on the bottom end 102 or focused tip 190 greater than a preset threshold, or detecting a normal force on the bottom end 102 or focused tip 190 greater than a preset threshold for a time interval greater than a preset minimum.

At time 1, at point 302, the user is in midstride. The walking stick is swinging above the ground. Thus, there is no contact or picture.

At time 2, at point 304, the user has re-planted the walking stick. The pressure resulting from the interaction between bottom end 102 or focused tip 190 and surface 104 results in the activation of switch 110. This causes an image to be taken by one or more cameras 120.

Figure 4:
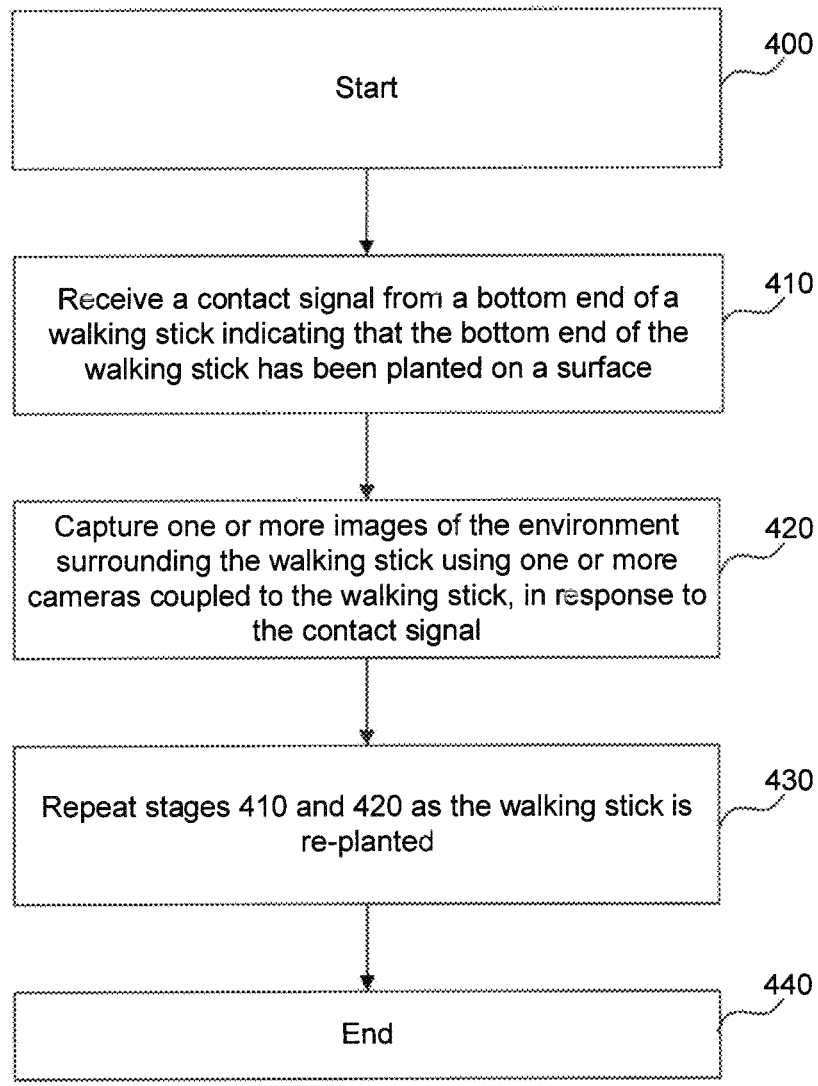
FIG. 4 is a flowchart of a method of using the walking stick, according to an embodiment.

FIG. 4 is a flowchart of a method of using the walking stick, according to an embodiment. In stage 400, the method begins. In stage 410, a contact signal is received from a bottom end of a walking stick indicating that the bottom end of the walking stick has been planted on a surface. For example, bottom end 102 of walking stick 100 and switch 110 may carry out this step. In stage 420, one or more images of the environment surrounding the walking stick are captured using one or more cameras 120 coupled to the walking stick, in response to the contact signal. In stage 430, stages 410 and 420 are repeated as the walking stick is re-planted. In stage 440, the method ends.

A walking stick as in embodiments or a method of using a walking stick as in embodiments provide a user with several advantages. First of all, the walking stick provides the functionality of an ordinary walking stick, in that it can be used by a user to aid in providing stability and balance. However, embodiments provide for a superior walking stick that has additional advantages. The one or more cameras that reside in a walking stick embodiment and that are used in a method embodiment are used in conjunction with signals from when the walking stick contacts the surface over which the user walks.

Such a method of operation is advantageous in that it provides a stable base for the one or more cameras by causing the walking stick to act as a monopod. Moreover, because users will generally have fairly regular strides, pictures of the surroundings of the area surrounding the walking stick will be taken at regular intervals. This provides for acquiring data which is appropriate for a virtual simulation the environment of the walking stick, because the image data can be transformed and combined to yield an interactive simulation of the environment of the walking stick. Furthermore, time stamps and location information from a GPS or IMU can improve the quality of the virtual environment data still further, by aiding virtual environment application 240 in combining the pieces of image data into a virtual environment visualization.

Thus, embodiments provide a convenient and effective way to aid in walking while simultaneously capturing data for a virtual representation of an environment that a user walks through.

The Summary and Abstract sections may set forth one or more but not all exemplary embodiments of the present invention as contemplated by the inventor(s), and thus are not intended to limit the present invention and the appended claims in any way.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teachings and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. An elongated member with environmental image-gathering features, comprising:
    an elongated member having a top end and a bottom end, the elongated member configured to be carried by a user;
    one or more imaging sensors coupled to the elongated member;
    a switch coupled to the bottom of the elongated member configured to activate the one or more imaging sensors to capture one or more images of the environment surrounding the elongated member each time the switch receives a signal that the user has planted the bottom end of the elongated member on a surface; and
    at least one of a location sensor or an inertial measurement unit (IMU) that provides location information about the position of the elongated member.

2. The elongated member of claim 1, further comprising a virtual environment module that associates the location information with the images captured by the one or more imaging sensors.

3. The elongated member of claim 1, further comprising a vertical grip area at the top of the elongated member to allow the user to hold the elongated member.

4. The elongated member of claim 1, further comprising a time-stamp module that time-stamps at least one of the images captured when the one or more imaging sensors capture the one or more images.

5. The elongated member of claim 1, further comprising at least one of an anti-shock module and a vibration isolation module to improve the quality of the images produced by the one or more imaging sensors.

6. The elongated member of claim 1, wherein the length of the elongated member is adjustable and the one or more cameras automatically adjust a set of parameters used to capture the one or more images based on the length of the elongated member.

7. The elongated member of claim 1, further comprising a focused tip coupled to the bottom end of the elongated member, such that the focused tip sends a signal to the switch that the user has planted the bottom end of the elongated member on a surface each time the focused tip contacts the surface.

8. The elongated member of claim 1, the switch comprising a force detector that detects that the bottom end of the elongated member has been planted on the surface by detecting a normal force greater than a preset threshold.

9. The elongated member of claim 8, wherein the force detector detects that the bottom end of the elongated member has been planted on the surface by detecting a normal force greater than a preset threshold value for a time interval greater than a preset minimum.

10. A method of capturing one or more environmental images, comprising:
    (a) receiving a contact signal from a bottom end of an elongated member indicating that the bottom end of the elongated member has been planted on a surface;
    (b) capturing one or more images of the environment surrounding the elongated member using one or more imaging sensors coupled to the elongated member, in response to the contact signal;
    (c) receiving location information from at least one of a location sensor and an inertial measurement unit (IMU) about a position of the elongated member when the bottom of the elongated member is planted on the surface and associating the position with the images;
    (d) repeating steps (a)-(c) as the elongated member is re-planted.

11. The method of claim 10, further comprising using the location information in conjunction with the images captured by the one or more imaging sensors to provide a simulation of the environment where the images were captured.

12. The method of claim 10, further comprising time-stamping the images captured by the one or more imaging sensors.

13. The method of claim 10, further comprising using at least one of anti-shock and vibration isolation technologies to improve the quality of the pictures taken by the one or more imaging sensors.

14. The method of claim 10, further comprising:
    adjusting the length of the elongated member; and
    automatically adjusting a set of parameters used by the one or more imaging sensors to capture the one or more images based on the adjusted length of the elongated member.

15. The method of claim 10, further comprising generating the contact signal when a focused tip coupled to the bottom end of the elongated member touches the surface.

16. The method of claim 10, further comprising detecting that the bottom end of the elongated member has been planted on the surface by detecting a normal force on the bottom end greater than a preset threshold value.

17. The method of claim 16, the detecting further comprising detecting that the bottom end of the elongated member has been planted on the surface by detecting the a normal force on the bottom end greater than a preset threshold value for a time interval greater than a preset minimum time.

\* \* \* \* \*

UNITED STATES PATENT AND TRADEMARK OFFICE
CERTIFICATE OF CORRECTION

| | | |
|---|---|---|
| PATENT NO. | : 8,467,674 B1 | Page 1 of 1 |
| APPLICATION NO. | : 13/239216 | |
| DATED | : June 18, 2013 | |
| INVENTOR(S) | : Ratner et al. | |

It is certified that error appears in the above-identified patent and that said Letters Patent is hereby corrected as shown below:

Title page:
Item (57) Abstract, line 5, please replace "one or more cameras Such" with --one or more cameras. Such--.

In the Claims:
Column 8
Line 37, please replace "the a normal force" with --the normal force--.

Signed and Sealed this
Sixth Day of May, 2014

Michelle K. Lee
*Deputy Director of the United States Patent and Trademark Office*